(12) United States Patent
Lo

(10) Patent No.: US 7,627,023 B1
(45) Date of Patent: *Dec. 1, 2009

(54) 64/66 ENCODER

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 594 days.

This patent is subject to a terminal disclaimer.

(21) Appl. No.: 11/453,193

(22) Filed: Jun. 14, 2006

Related U.S. Application Data

(60) Provisional application No. 60/732,604, filed on Nov. 1, 2005.

(51) Int. Cl.
*H04B 1/38* (2006.01)

(52) U.S. Cl. ...................... 375/222; 375/260

(58) Field of Classification Search ......... 375/219–222, 375/260
See application file for complete search history.

(56) References Cited

U.S. PATENT DOCUMENTS

| | | | |
|---|---|---|---|
| 6,362,757 B1 | 3/2002 | Lee et al. | |
| 6,430,201 B1 | 8/2002 | Azizoglu et al. | |
| 6,476,737 B1 | 11/2002 | Caroselli et al. | |
| 6,504,493 B1 | 1/2003 | Burd | |
| 6,519,280 B1 | 2/2003 | Cole | |
| 6,718,139 B1 | 4/2004 | Finan et al. | |
| 6,813,651 B1 | 11/2004 | Smith et al. | |
| 6,823,483 B1 | 11/2004 | Creigh | |
| 7,089,485 B2 | 8/2006 | Azadet et al. | |
| 7,251,699 B1 * | 7/2007 | Lo | 709/250 |
| 7,339,995 B2 | 3/2008 | Renaud | |
| 7,373,454 B1 | 5/2008 | Noe | |
| 2001/0034729 A1 | 10/2001 | Azadet et al. | |
| 2002/0138675 A1 | 9/2002 | Mann | |
| 2003/0147654 A1 | 8/2003 | Sung et al. | |
| 2003/0187994 A1 | 10/2003 | Jackson | |
| 2005/0111532 A1 | 5/2005 | Creigh | |
| 2006/0209735 A1 | 9/2006 | Evoy | |
| 2007/0047572 A1 | 3/2007 | Desai et al. | |
| 2008/0215777 A1 * | 9/2008 | Richenstein et al. | 710/69 |

OTHER PUBLICATIONS

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section One; IEEE Computer Society; Sponsored by the LAN/MAN Standards Committee; Mar. 8, 2002; 578 pages.

(Continued)

*Primary Examiner*—Emmanuel Bayard

(57) ABSTRACT

A physical layer device for a network interface includes a reconciliation device that includes a first interface that outputs data. A physical coding sublayer (PCS) device communicates with the first interface and includes an encoder that encodes the data to produce an encoded data block including an offset portion and n data blocks, each including at least one of data portions and control code portions. The encoder is capable of locating the control code portions within any of the n data blocks based on the offset portion.

56 Claims, 9 Drawing Sheets

OTHER PUBLICATIONS

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section Two; IEEE Computer Society; Sponsored by the LAN/MAN Standards Committee; Mar. 8, 2002; 582 pages.

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section Three; IEEE Computer Society; Sponsored by the LAN/MAN Standards Committee; Mar. 8, 2002; 379 pages.

U.S. Appl. No. 10/601,235, filed Jun. 20, 2003, Lo, William.

IEEE Std. 802.3-2002 (Revision of IEEE 802.3, 2000 Edition); IEEE Standard for Information Technology—Telecommunications and information exchange between systems—local and metropolitan areaa networks—Specific requirements Part 3: Carrier sense multiple access with collision detection (CSMA/CD) access method and physical layer speficiations; IEEE Computer Society; Sponsored by the LAN/MAN Standards Committee; Mar. 8, 2002; 1538 pages.

\* cited by examiner

FIG. 3
Prior Art

| Input Data | SYNC (0 1 2) | Block Payload | | | | | | | |
|---|---|---|---|---|---|---|---|---|---|
| Bit Position | | $D_0$ | $D_1$ | $D_2$ | $D_3$ | $D_4$ | $D_5$ | $D_6$ | $D_7$ |
| Data Block Format: | | | | | | | | | |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | | $D_1$ | $D_2$ | $D_3$ | $O_0$ | $D_5$ | $D_6$ | $D_7$ |
| $O_0D_1D_2D_3/O_4D_5D_6D_7$ | 10 | 0x55 | | $D_1$ | $D_2$ | $D_3$ | $O_0$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | $D_5$ | $D_6$ | $D_7$ | |
| $O_0D_1D_2D_3/C_4C_5C_6C_7$ | 10 | 0x4b | | $D_1$ | $D_2$ | $D_3$ | $O_0$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

় # 64/66 ENCODER

CROSS-REFERENCE TO RELATED APPLICATIONS

This application claims the benefit of U.S. Provisional Application No. 60/732,604 filed on Nov. 1, 2005, which is hereby incorporated by reference in its entirety.

FIELD OF THE INVENTION

The present invention relates to networks, and more particularly to data coding in physical coding sublayers of physical layer devices in Ethernet network devices.

BACKGROUND OF THE INVENTION

Ethernet network devices include physical layer devices that transmit and receive data over a medium. In a Gigabit (Gb) network device, the physical layer device includes a Physical Coding Sublayer (PCS), which acts as an interface between a Gigabit Media Independent Interface (GMII) or extended GMII (XGMII) and a Physical Medium Attachment (PMA) layer.

The PCS typically includes an encoder/decoder. The PCS may also include other components such as a scrambler and a gearbox in certain circumstances. The gearbox is not necessary when an analog circuit in the PMA can be designed to run in multiples of a reference clock or multiples of bus widths, both of which are not easy to implement. In essence, the gearbox is a digital solution that is used to overcome analog circuit limitations. The encoder provides data formatting and organizes the data into data blocks (such as bytes) and control codes. The scrambler performs line balancing and ensures sufficient transition density. The function of the gearbox is application specific. The gearbox may include a buffer that is used to adjust for input/output speed differences and/or to format data width for a Serializer/Deserializer (SERDES).

In one approach, the PCS is implemented based on the 10GBASE-R standard in IEEE section 802.3, which is hereby incorporated by reference. The 10GBASE-R standard implements 64/66 bit encoding, which has low overhead. The 10GBASE-R standard restricts the placement of control codes within a data block during block encoding. When multiple independent communications channels are aggregated to provide high-speed link, control codes may need to appear in any byte position of a data block after the channels are combined. Therefore, the 10GBASE-R standard may pose problems for aggregated communications channels.

SUMMARY OF THE INVENTION

A physical layer device for a network interface includes a reconciliation device that includes a first interface that outputs data. A physical coding sublayer (PCS) device communicates with the first interface and includes an encoder that encodes the data to produce an encoded data block including an offset portion and n data blocks, each including at least one of data portions and control code portions. The encoder is capable of locating the control code portions within any of the n data blocks based on the offset portion.

In other features the offset portion includes at least one offset count. The offset portion includes a bit map that represents the data portions and control code portions included in the n data blocks. The offset portion indicates a quantity of the control code portions. The offset portion includes a data format that is based on a quantity of the control code portions. In other features the physical layer device includes a multiplexer that aggregates data, which includes at least one of data portions and control portions, from m data streams received from the reconciliation device into a multiplexed data block. The first interface is at least one of XGMII compliant and GMII compliant. The physical layer device includes a scrambler that communicates with the encoder and that scrambles the encoded data block to produce a scrambled data block, and a sync adder that adds a sync header to the scrambled data block. The sync header has a first state when the scrambled data block only includes the data portions. The sync header has a second state when the scrambled data block includes at least one of the control code portions. The physical layer device includes a serializer/deserializer (SERDES) that communicates with the scrambler. The PCS module implements 64/66 bit encoding. The PCS device is otherwise compliant with the 10GBASE-R section of the Institute of Electrical and Electronics Engineers (IEEE) 802.3 specification. A network transmitter includes the physical layer device.

A physical layer device of an Ethernet network device includes a serializer/deserializer that has an input and an output that outputs an encoded data block. A physical coding sublayer (PCS) device communicates with the output and includes a decoder that decodes the encoded data block. The encoded data block includes an offset portion and n data blocks, each including at least one of data portions and control code portions. The control code portions can be located within any of the n data blocks.

In other features the decoder reads the offset portion of the encoded data block. The decoder determines a quantity of the control code portions based on the offset portion.

In other features the physical layer device includes a reconciliation device that includes a first interface that receives decoded data from the decoder. The first interface is at least one of XGMII compliant and GMII compliant. The encoded data block from the serializer/deserializer is scrambled and includes a sync header. The physical layer device includes a descrambler that descrambles the encoded data block for the decoder. The sync header has a first state when the n data blocks only include the data portions. The sync header has a second state when the n data blocks include at least one of the control code portions. The decoder decodes the encoded data block based on the sync header and the offset portion. The PCS device implements 64/66 bit decoding. A network receiver includes the physical layer device.

A method of operating a physical layer device for a network interface includes receiving data from a first interface of a reconciliation device; and encoding the data to produce an encoded data block. The encoded data block includes an offset portion and n data blocks, each including at least one of data portions and control code portions. The control code portions can be located within any of the n data blocks based on the offset portion.

In other features the offset portion includes at least one offset count. The offset portion includes a bit map that represents the data portions and control code portions included in the n data blocks. The offset portion indicates a quantity of the control code portions. The offset portion includes a data format that is based on a quantity of the control code portions.

In other features the method includes aggregating data, which includes at least one of data portions and control portions, from m data streams received from the reconciliation device into a multiplexed data block. The first interface is at least one of XGMII compliant and GMII compliant. The method includes scrambling the encoded data block to produce a scrambled data block and adding a sync header to the scrambled data block. The sync header has a first state when the scrambled data block only includes the data portions. The sync header has a second state when the scrambled data block includes at least one of the control code portions. The method includes serializing the scrambled data block. The encoding step is otherwise compliant with the 10GBASE-R section of the Institute of Electrical and Electronics Engineers (IEEE) 802.3 specification.

A method of operating a physical layer device of an Ethernet network device includes converting serialized data into an encoded data block and decoding the encoded data block. The encoded data block includes an offset portion and n data blocks, each including at least one of data portions and control code portions. The control code portions can be located within any of the n data blocks.

In other features the decoding step includes reading the offset portion of the encoded data block. The method includes comprising determining a quantity of the control code portions based on the offset portion. The method includes communicating decoded data from the decoding step to a first interface of a reconciliation device. The encoded data block is scrambled and includes a sync header. The method includes descrambling the encoded data block prior to the decoding step. The sync header has a first state when the n data blocks only include the data portions. The sync header has a second state when the n data blocks include at least one of the control code portions. The decoding step decodes the encoded data block based on the sync header and the offset portion.

A computer program executed by a processor for operating a physical layer device of an Ethernet network device includes converting serialized data into an encoded data block and decoding the encoded data block. The encoded data block includes an offset portion and n data blocks, each including at least one of data portions and control code portions. The control code portions can be located within any of the n data blocks.

In other features the decoding step includes reading the offset portion of the encoded data block. The computer program includes determining a quantity of the control code portions based on the offset portion. The computer program includes communicating decoded data from the decoding step to a first interface of a reconciliation device. The encoded data block is scrambled and includes a sync header. The computer program includes descrambling the encoded data block prior to the decoding step. The sync header has a first state when the n data blocks only include the data portions. The sync header has a second state when the n data blocks include at least one of the control code portions. The decoding step decodes the encoded data block based on the sync header and the offset portion.

A computer program executed by a processor for operating a physical layer device for a network interface includes receiving data from a first interface of a reconciliation device; and encoding the data to produce an encoded data block. The encoded data block includes an offset portion and n data blocks, each including at least one of data portions and control code portions. The control code portions can be located within any of the n data blocks based on the offset portion.

In other features the offset portion includes at least one offset count. The offset portion includes a bit map that represents the data portions and control code portions included in the n data blocks. The offset portion indicates a quantity of the control code portions. The offset portion includes a data format that is based on a quantity of the control code portions.

In other features the computer program includes aggregating data, which includes at least one of data portions and control portions, from m data streams received from the reconciliation device into a multiplexed data block. The first interface is at least one of XGMII compliant and GMII compliant. The computer program includes scrambling the encoded data block to produce a scrambled data block and adding a sync header to the scrambled data block. The sync header has a first state when the scrambled data block only includes the data portions. The sync header has a second state when the scrambled data block includes at least one of the control code portions. The computer program includes serializing the scrambled data block. The encoding step is otherwise compliant with the 10GBASE-R section of the Institute of Electrical and Electronics Engineers (IEEE) 802.3 specification.

A physical layer device for a network interface includes reconciliation means for generating data at a first interface thereof. The physical layer device also includes physical coding sublayer (PCS) means for communicating with the first interface and including encoding means for encoding the data to produce an encoded data block including an offset portion and n data blocks, each including at least one of data portions and control code portions. The encoding means is capable of locating the control code portions within any of the n data blocks based on the offset portion.

In other features the offset portion includes at least one offset count. The offset portion includes a bit map that represents the data portions and control code portions included in the n data blocks. The offset portion indicates a quantity of the control code portions. The offset portion includes a data format that is based on a quantity of the control code portions.

In other features the physical layer device includes multiplexing means for aggregating data, which includes at least one of data portions and control portions, from m data streams received from the reconciliation means into a multiplexed data block. The first interface is at least one of XGMII compliant and GMII compliant. The physical layer device includes scrambler means for communicating with the encoding means and scrambling the encoded data block to produce a scrambled data block. The physical layer device includes sync adder means for adding a sync header to the scrambled data block. The sync header has a first state when the scrambled data block only includes the data portions. The sync header has a second state when the scrambled data block includes at least one of the control code portions. The physical layer device includes serializer/deserializer (SERDES) means for communicating with the scrambler means. The PCS means implements 64/66 bit encoding. The PCS means is otherwise compliant with the 10GBASE-R section of the Institute of Electrical and Electronics Engineers (IEEE) 802.3 specification.

A physical layer device of an Ethernet network device includes a serializer/deserializer means for outputting an encoded data block from an output thereof. The physical layer device also includes physical coding sublayer (PCS) means for communicating with the output including decoding means for decoding the encoded data block. The encoded data block includes an offset portion and n data blocks, each including at least one of data portions and control code portions. The control code portions can be located within any of the n data blocks.

In other features the decoding means reads the offset portion of the encoded data block. The decoding means determines a quantity of the control code portions based on the offset portion.

In other features the physical layer device includes reconciliation means for receiving decoded data from the decoding means at a first interface thereof. The first interface is at least one of XGMII compliant and GMII compliant. The encoded data block from the serializer/deserializer is scrambled and includes a sync header. The physical layer device further comprises descrambler means for descrambling the encoded data block for the decoding means. The sync header has a first state when the n data blocks only include the data portions. The sync header has a second state when the n data blocks include at least one of the control code portions. The decoding means decodes the encoded data block based on the sync header and the offset portion. The PCS means implements 64/66 bit decoding.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates the combinations of control codes and data bytes within a data block using 64/66 bit encoding according to the prior art;

DETAILED DESCRIPTION OF THE PREFERRED EMBODIMENTS

Figure 1:
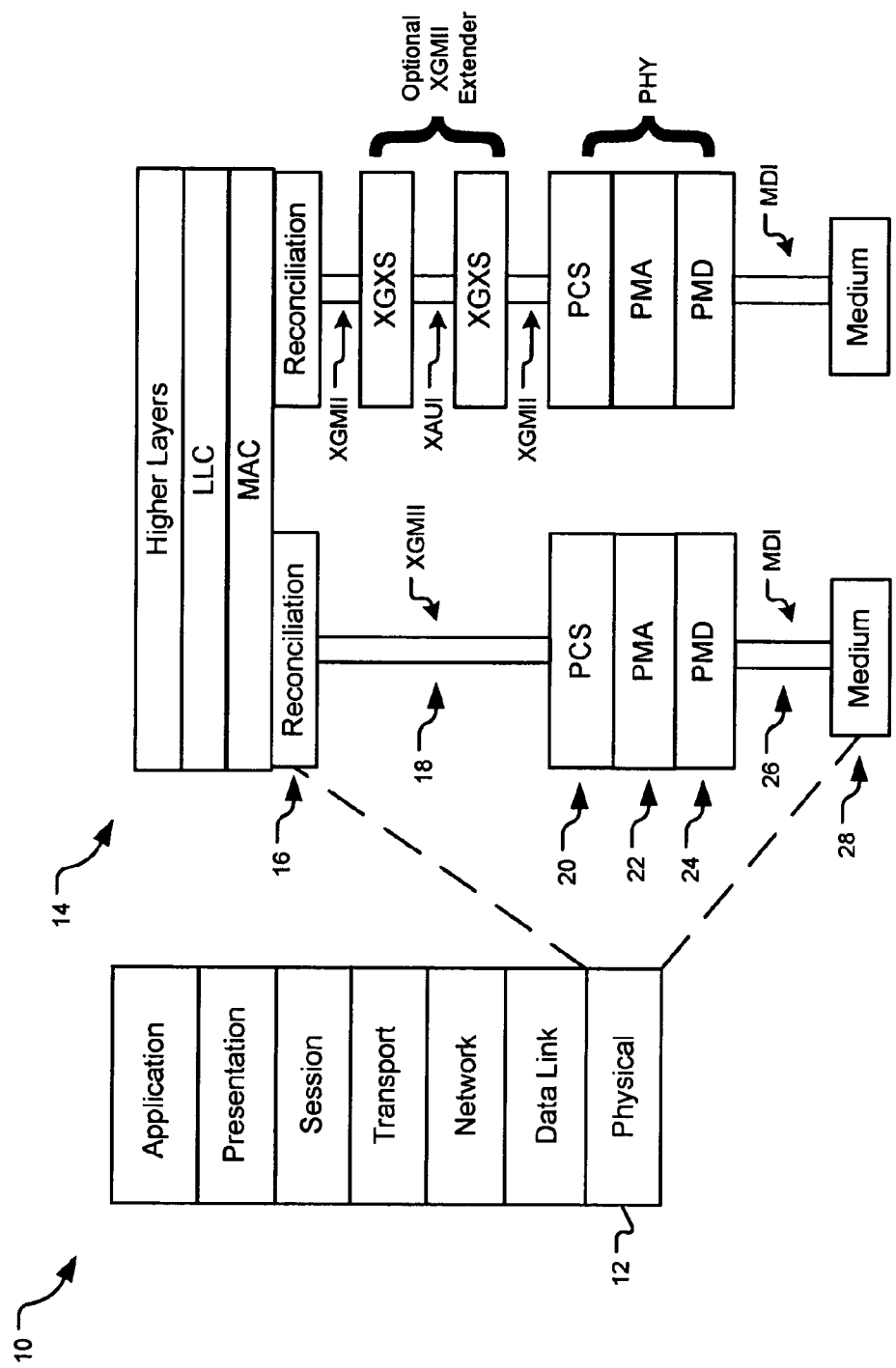
FIG. 1 illustrates the OSI Model and sublayers in a physical layer device according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term device refers to an application specific integrated circuit, an electronic circuit, a processor (shared, dedicated, or group) and memory that execute one or more software programs, a combinational logic circuit, or other suitable components that provide the described functionality.

Referring to FIG. 1, the OSI Reference Model 10 defines a network device with a physical layer device 12 that transmits and receives data to/from a medium. The physical layer device 12 is further divided into a group of sublayer devices 14. FIG. 1 illustrates the group of sublayer devices 14 for Ten Gigabit Ethernet applications. The group of sublayer devices 14 includes a Ten Gigabit Ethernet reconciliation sublayer 16, a XGMII 18, a PCS 20, a PMA 22, a Physical Medium Dependant (PMD) sublayer 24, and a Medium Dependant Interface (MDI) 26. The medium is identified at 28. The PCS 20 encodes/decodes data to/from the XGMII 18 and transfers encoded data to/from the PMA 22.

Figure 2:
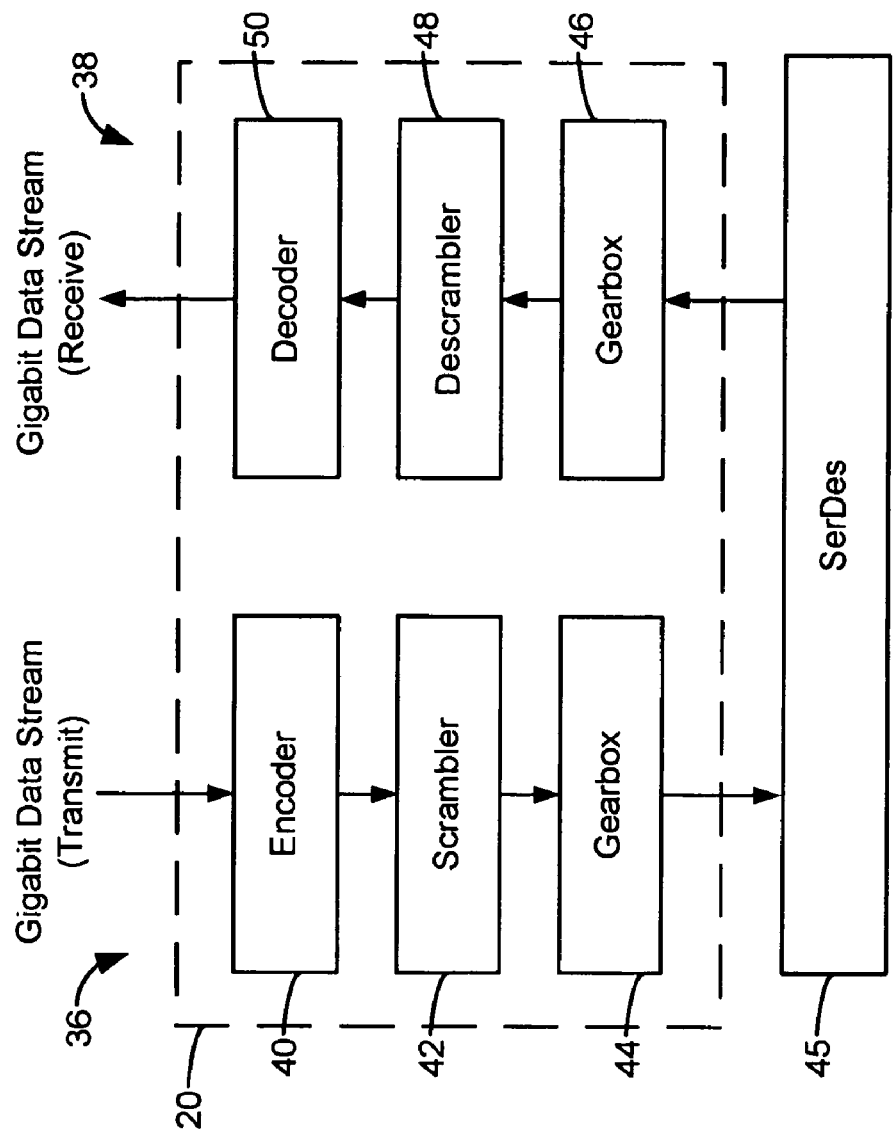
FIG. 2 is a functional block diagram of the transmitter and receiver of the PCS according to the prior art.

Referring now to FIG. 2, the PCS 20 includes a transmitter 36 and a receiver 38. The transmitter 36 includes an encoder 40, which assembles data blocks that include data bytes and/or control codes for transmission. The control codes include identification of the start and/or end of a packet and/or other data. The data blocks are transmitted from the encoder 40 to a scrambler 42. The scrambler 42 prepares the data blocks for transmission and ensures sufficient transition density. Data from the scrambler 42 is transmitted to a gearbox 44. The gearbox 44 formats data for a particular SERDES 45. The gearbox 44 may include a FIFO buffer, which is used to convert from one speed to another and/or to modify the width of a bit pattern. The receiver includes a gearbox 46, a descrambler 48, and a decoder 50, which implement the reverse of the transmit process.

For each data block transmitted, it is desirable to allow for 256 combinations of data and a limited number of control codes. For example, in 1000BASE-X 8 bit to 10 bit encoding, there are 256 possible data combinations and 12 possible control code combinations. Since there are 256+12=268 total combinations, 9 bits of data are required to encode all valid data blocks. The overhead is high because an additional bit is used to generate only 12 more combinations. When 8 bit to 10 bit encoding is implemented, 10 bits are used instead of 9, which produces an even larger overhead. However, 10 bits are used in 1000BASE-X to preserve DC balance and to ensure that sufficient transitions exist through redundant bits.

A 64/66 bit block coding concept is implemented by IEEE 802.3 in the 10GBASE-R PCS. 10GBASE-R reduces overhead and achieves DC balance through scrambling and guaranteed periodic transitions with a sync header. The additional coding complexity on the digital side increases latency in the system. Since the circuit can be run at a lower rate, power is saved.

Referring now to FIG. 3, a block encoding scheme 58 for 10GBASE-R is shown. The block encoding scheme 58 is set forth in IEEE 802.3, which is hereby incorporated by reference in its entirety. A 2-bit sync header 60 is followed by a 64-bit block of data 62. Each 64-bit block of data 62 includes 8 bytes that may be data bytes 64 and/or control codes 66. Bytes labeled with a C, O, S, or T represent control codes 66. Bytes labeled with a D represent data bytes 64. A sync header 60 with a value of 01 indicates that the entire 64-bit block of data 62 is made up of data bytes 64. When the sync header 60 has a value of 10, at least one of the control codes 66 exists among the 64-bit block of data 62.

FIG. 3 shows that there are a limited number of permutations for the control codes 66 and data bytes 64. Many combinations are not possible. For example, the combination $C_0$, $D_1$, $C_2$, $C_3$, $D_4$, $C_5$, $D_6$, $C_7$ is not possible. This limitation creates a problem when control codes 66 need to be placed within any byte in a 64-bit block of data 62. For example, when multiple independent data streams are aggregated into a high-speed link, control codes 66 need to appear in any location of a 64-bit block of data 62. Aggregation is very useful in reducing the pin count of devices. Therefore, the 10GBASE-R PCS cannot be used as currently designed when multiple independent data streams need to be aggregated.

Figure 4:
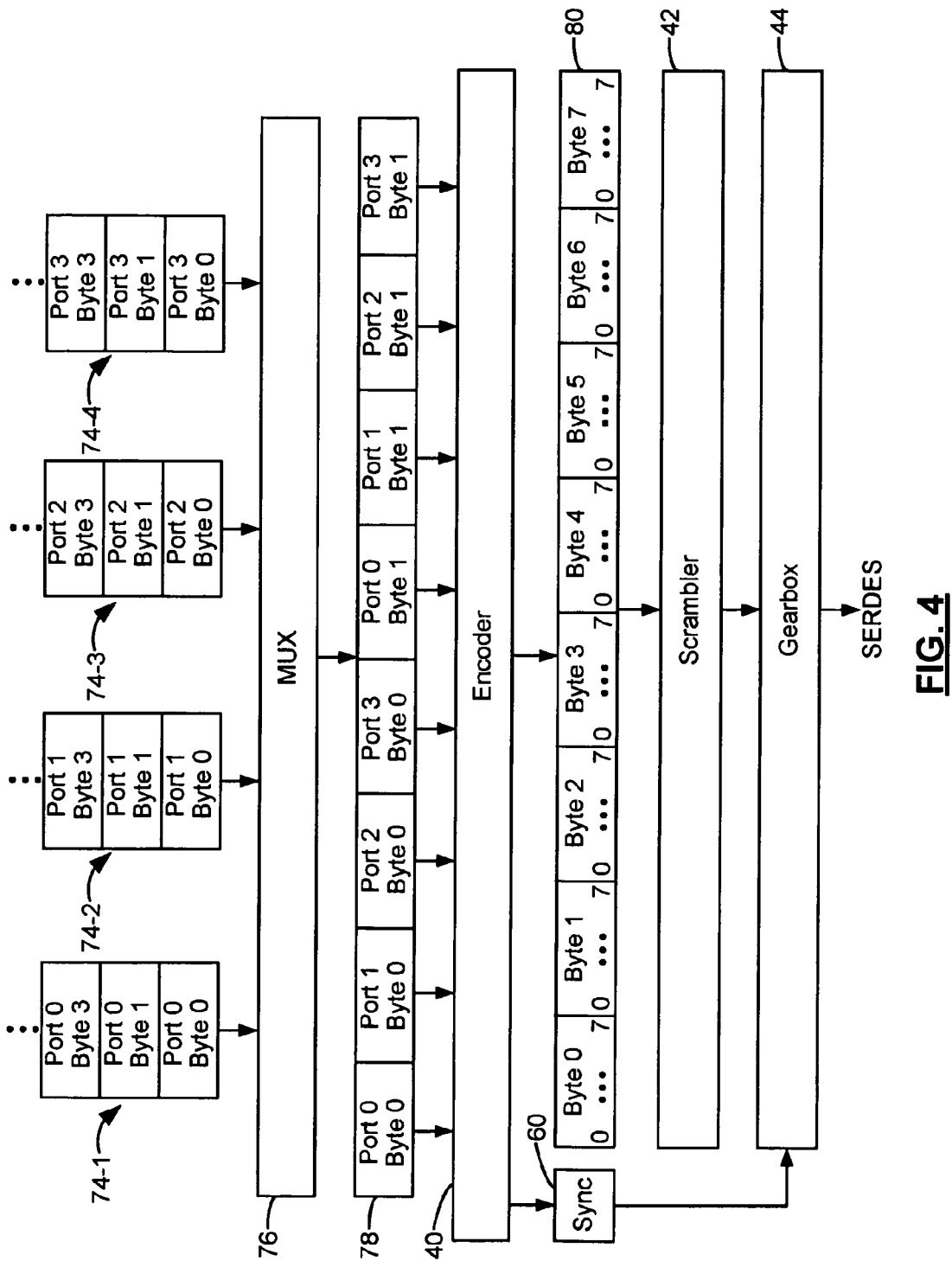
FIG. 4 is a functional block diagram of data processing within the PCS according to the present invention.

Referring now to FIG. 4, a transmitter 36 for a PCS device 20 according to the present invention is illustrated. Four independent data streams 74-1, 74-2, 74-3, and 74-4 are combined by a multiplexer 76 into an 8-byte data block 78. The encoder 40 outputs an encoded data block 80 as well as the 2 bit sync header 60. The encoded data block 80 is transmitted to the scrambler 42. The sync header 60 is used by a receiver to lock onto a data block. The sync header 60 bypasses the scrambler 42. Both a scrambled data block and the sync header 60 are input to the gearbox 44. Data from the gearbox 44 is transmitted to a SERDES 45. The scrambler 42 and the gearbox 44 operate according to the 10GBASE-R standard. However, the coding scheme implemented by the encoder 40 is different than the coding performed in 10GBASE-R.

Figure 5A:
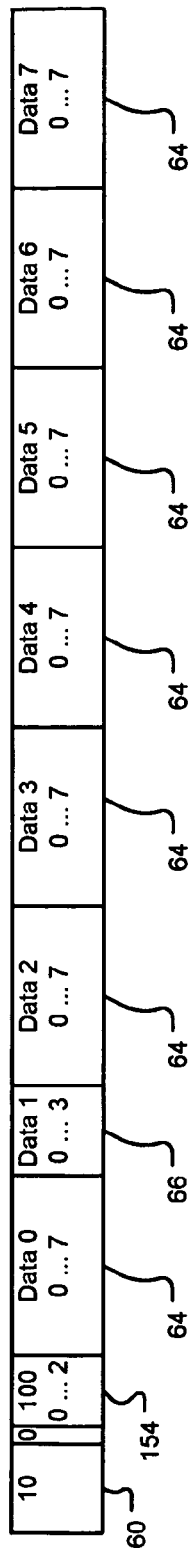
FIG. 5A illustrates an exemplary 64/66 bit encoded data block with one control code according to the present invention.
Figure 5B:
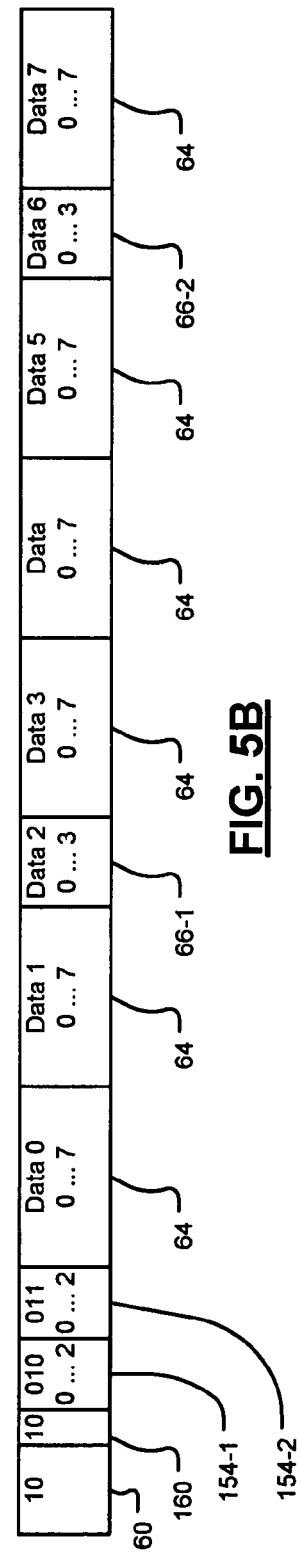
FIG. 5B illustrates an exemplary 64/66 bit encoded data block with two control codes according to the present invention.
Figure 5C:
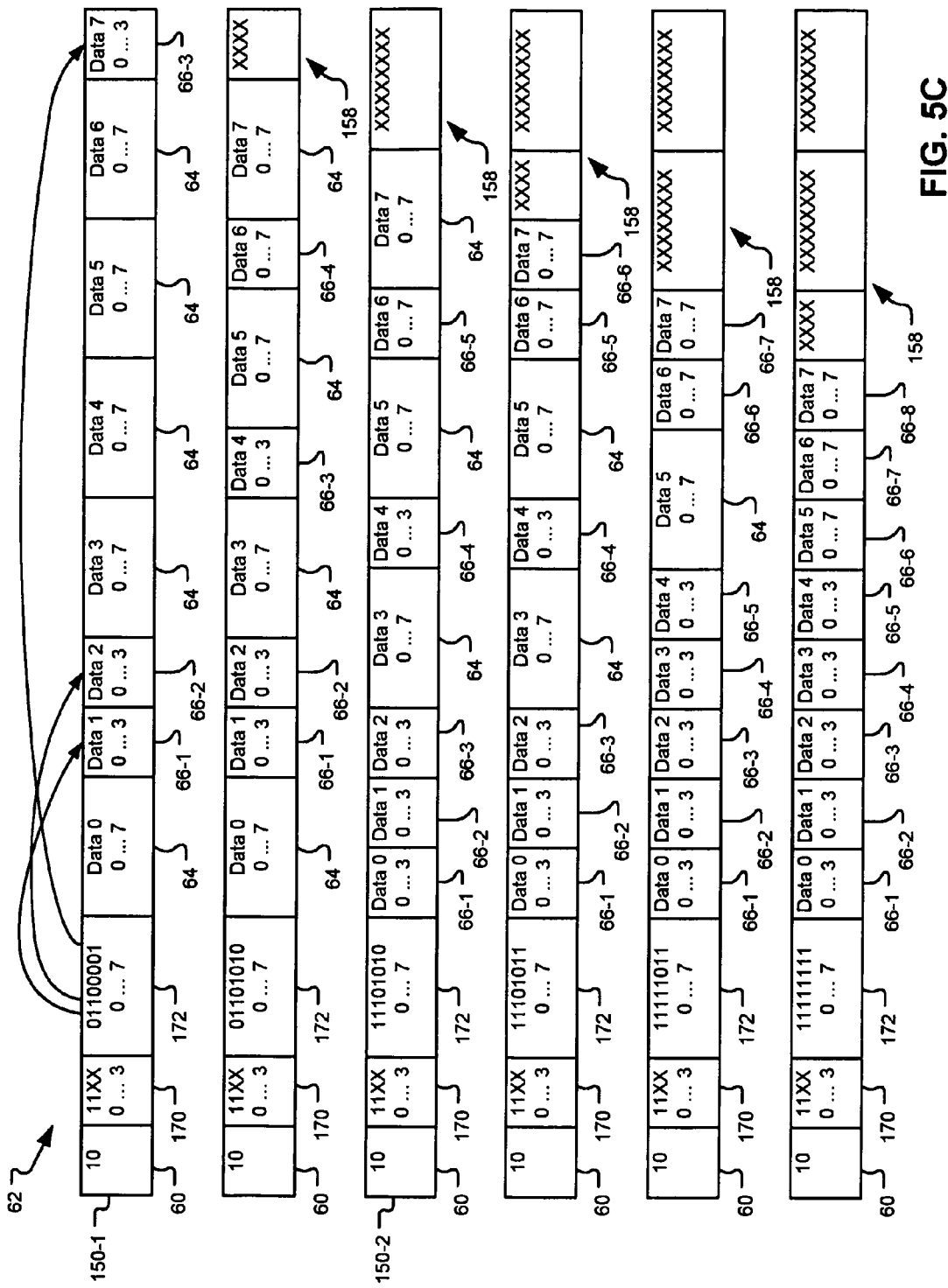
FIG. 5C illustrates exemplary 64/66 bit encoded data block with between three and eight control codes according to the present invention.

Referring now to FIGS. 5A-5C, the coding according to the present invention provides for data 62 to include between one and eight control codes 66. Each control code 66 is four-bits wide. The remainder of data 62 includes data bytes 64 and/or "don't care" data. The sync header 60 is set to "10" to indicate that data 62 includes the control codes 66. Two more bits immediately follow the sync header 60 and indicate whether data 62 includes one, two, or between three and eight control codes 66.

Referring now to FIG. 5A, an example is shown of data 62 that includes one control code 66. A "0" immediately follows the sync header 60. The "0" is part of an offset portion of the data 62 and indicates that data 62 includes only one control code 66. A 3-bit field 154 follows the "0" and includes an offset to a location of the control code 66. The offset is between zero and seven and referenced to locations Data 0 in data 62. The offset is an unsigned binary number written with the LSB on the left. In the depicted example the reverse-ordered offset is "100", which is equal to decimal "1". The control code 66 is therefore stored in location Data 1.

Referring now to FIG. 5B, an example is shown of data 62 that includes two control codes 66-1 and 66-2. A two-bit field 160 includes a bit pattern "10" and immediately follows the sync header 60. The "10" bit pattern in field 160 is part of the offset portion of data 62 and indicates that data 62 includes only two control codes 66. Two 3-bit fields 154-1 and 154-2 follow field 160 and include offsets of respective control codes 66-1 and 66-2 in the data 62. In the depicted example, the first field 154-1 includes the reverse-ordered offset "010", which is equal to decimal "2". The first control code 66-1 is therefore stored in location Data 2. The second field 154-2 includes the reverse-ordered offset "011", which is equal to decimal "6". The second control code 66-2 is therefore stored in location Data 6.

Referring now to FIG. 5C, several examples are shown of data 62 that includes between three and eight control codes 66-1, . . . , 66-8. A four-bit pattern 170 of "11XX" immediately follows the sync header 60. The "11XX" is included in the offset portion of data 62 and indicates that data 62 includes between three and eight control codes 66. An eight-bit field 172 follows the "11 XX" and includes bit-mapped offsets of each control code 66. Each bit in the field 172 represents a corresponding data byte 64 (if the bit is equal to zero) or a corresponding control code 66 (if the bit is equal to one.) The LSB of the bit map is on the left and represents the Data 0 position in data 62. In the examples of FIG. 5C the order of the bit map is always given from Data 0 to Data 7 and don't care data (X's) are always inserted at the end of data 62. It is possible to rearrange the order of data 62 or place the don't care data in different positions without a loss of generality.

In a first example 150-1, the field 172 includes ones in the locations of bit 1, bit 2, and bit 7. The control codes 66 are therefore located in the Data 1, Data 2, and Data 7 locations. In a second example 150-2, the field 172 includes ones in the locations of bit 0, bit 1, bit 2, bit 4, and bit 6 positions. The control codes 66 are therefore located in the Data 0, Data 1, Data 2, Data 4, and Data 6 locations.

The remaining examples of FIG. 5C include other bit patterns in field 172 and corresponding control codes 66. It should be appreciated that still other bit patterns can be used to indicate still other combinations of control code 66 locations.

Figure 6:
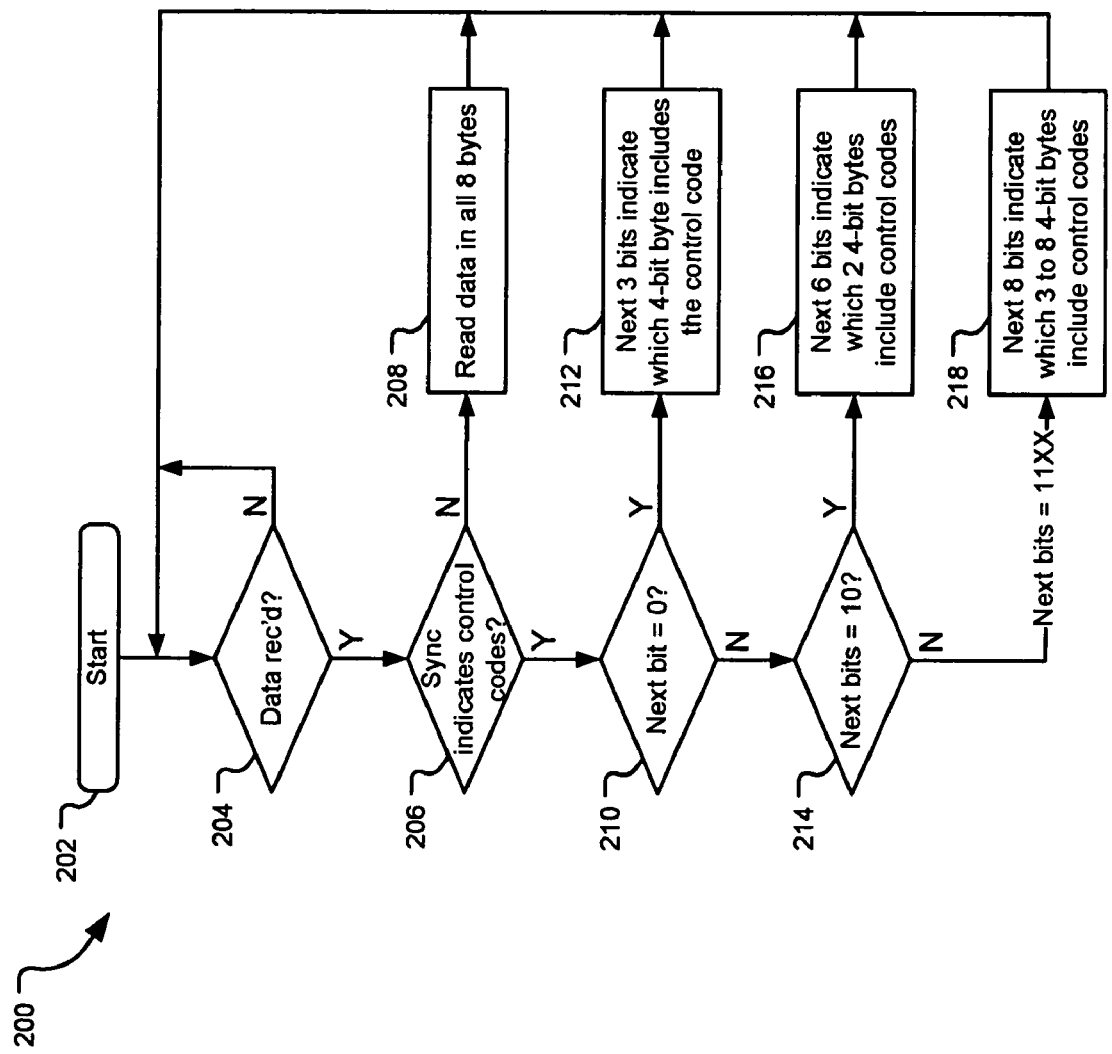
FIG. 6 illustrates a flowchart of a method for decoding the encoded data blocks shown in FIGS. 5A-5C.

Referring now to FIG. 6, a decoding algorithm 200 according to the present invention is shown. Algorithm 200 can be executed in a decoder 50 for a PCS device 20. Algorithm 200 can be used to decode data 62 that is encoded according to the patterns described in FIGS. 5A-5C. Control begins in step 202. Control immediately proceeds to block 204 and determines whether data 62 is being received. If it is not, control waits for data 62 by re-entering decision block 204. Control proceeds to decision block 206 upon receiving data 62. In decision block 206, control examines the sync header 60 to determine whether data 62 includes any control codes 66. If data 62 does not contain any control codes 66 then control branches to block 208 and reads data bytes 64 from all eight bytes of data 62. Control then returns to decision block 204.

On the other hand if control determines, in decision block 206, that data 62 includes control codes 66, then control branches to decision block 210. In decision block 210 control determines whether the bit following the sync header 60 is equal to zero. If it is, then data 62 includes a single control code 66 and control branches to block 212 to read the offset from field 154 and locate the control code 66 accordingly. Control then returns to decision block 204.

On the other hand if control determines, in decision block 210, that data 62 includes more than one control code 66, then control branches to decision block 214. In decision block 214 control determines whether the two bits following the sync header 60 are equal to "10" and. If they are, the data 62 includes two control codes 66 and control branches to block 216 to read the offsets from locations 154 and locate the corresponding control codes 66 accordingly. Control then returns to decision block 204. On the other hand, if control determines, in decision block 214, that data 62 includes more than two control codes 66, then control branches to block 218. In block 218 control uses the bit-mapped offsets in location 170 to locate the control codes 66.

Figure 7B:
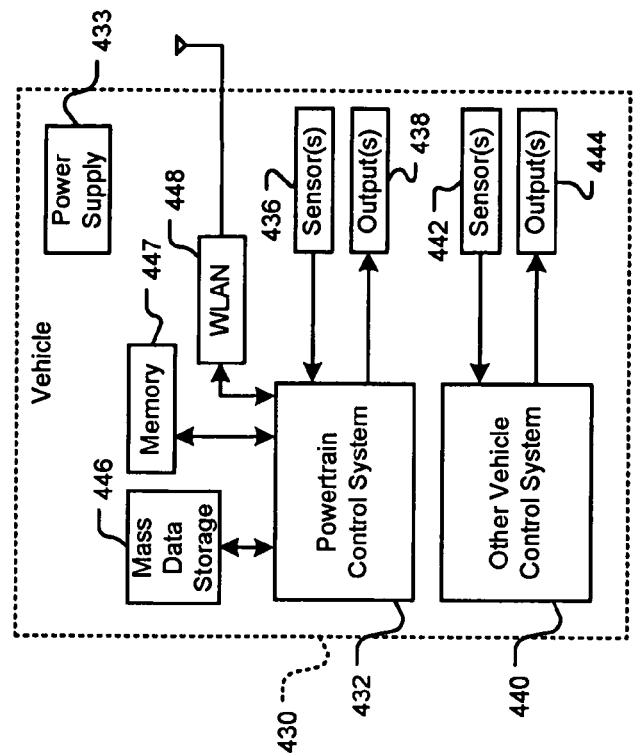
FIG. 7B is a functional block diagram of a vehicle control system.
Figure 7A:
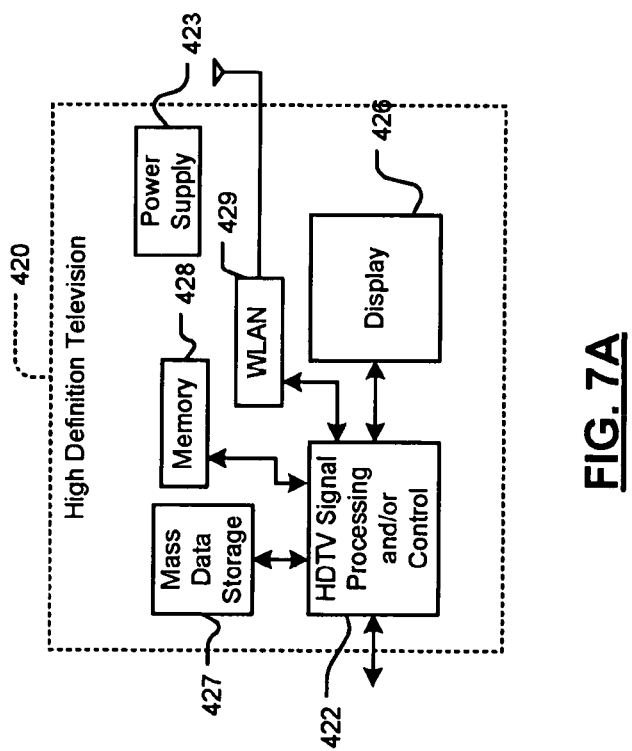
FIG. 7A is a functional block diagram of a high definition television.

Referring now to FIGS. 7A-7D, various exemplary implementations of the present invention are shown. Referring now to FIG. 7A, the present invention can be implemented in a high definition television (HDTV) 420. The present invention may implement and/or be implemented in either or both signal processing and/or control circuits, which are generally identified in FIG. 7A at 422. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The mass data storage 427 may include at one HDD and/or at least one DVD player/recorder. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429. The HDTV 420 may also include a power supply 423.

Referring now to FIG. 7B, the present invention may implement and/or be implemented in a control system of a vehicle 430. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include at one HDD and/or at least one DVD player/recorder. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). The vehicle 430 may include a power supply 433.

Figure 7C:
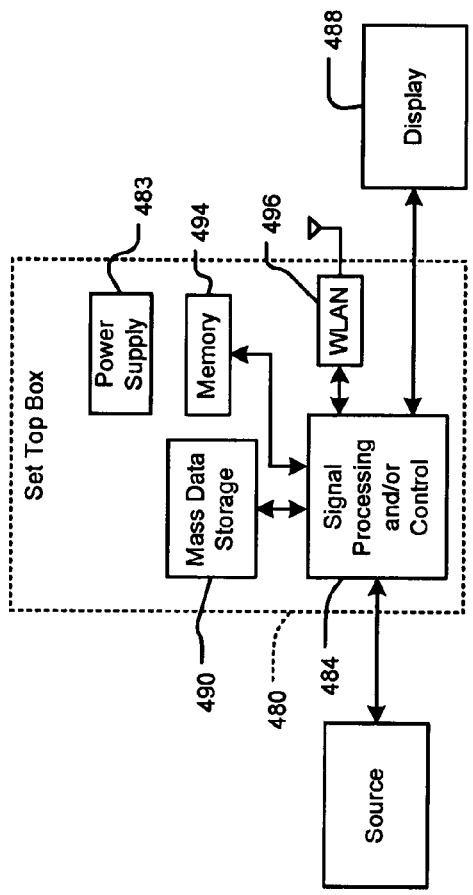
FIG. 7C is a functional block diagram of a set top box.

Referring now to FIG. 7C, the present invention can be implemented in a set top box 480. The present invention may implement and/or be implemented in either or both signal processing and/or control circuits, which are generally identified in FIG. 7C at 484. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include at one HDD and/or at least one DVD player/recorder. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. The set top box 480 may include a power supply 483.

Figure 7D:
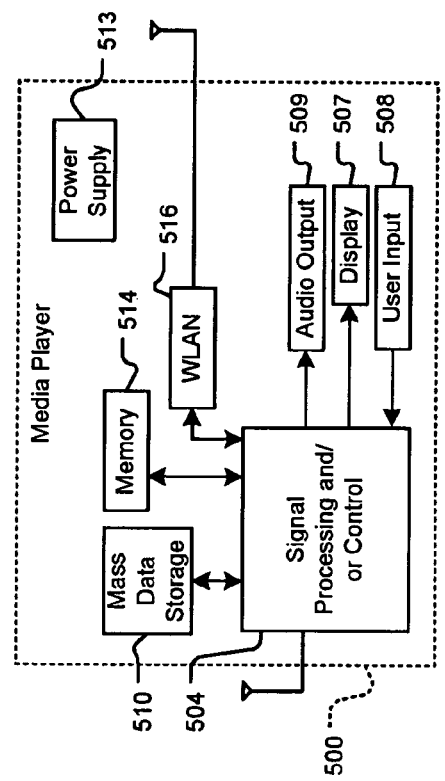
FIG. 7D is a functional block diagram of a media player.

Referring now to FIG. 7D, the present invention can be implemented in a media player 500. The present invention may implement and/or be implemented in either or both signal processing and/or control circuits, which are generally identified in FIG. 7D at 504. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include at one HDD and/or at least one DVD player/recorder. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. The media player 500 may also include a power supply 503. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A physical layer device for a network interface, the physical layer device comprising:
   a reconciliation device that includes a first interface that outputs data; and
   a physical coding sublayer (PCS) device that communicates with the first interface and that includes an encoder that encodes the data to produce an encoded data block, the encoded data block including an offset portion and n data blocks, each of the n data blocks including at least one of data portions and control code portions,
   wherein the encoder is capable of locating the control code portions within any of the n data blocks based on the offset portion, and
   wherein n is an integer greater than zero.

2. The physical layer device of claim 1 wherein the offset portion includes at least one offset count.

3. The physical layer device of claim 1 wherein the offset portion includes a bit map that represents the data portions and control code portions included in the n data blocks.

4. The physical layer device of claim 1 wherein the offset portion indicates a quantity of the control code portions.

5. The physical layer device of claim 1 wherein the offset portion includes a data format that is based on a quantity of the control code portions.

6. The physical layer device of claim 1 further comprising a multiplexer that aggregates data, which includes at least one of data portions and control portions, from m data streams received from the reconciliation device into a multiplexed data block.

7. The physical layer device of claim 1 wherein the first interface is at least one of XGMII compliant and GMII compliant.

8. The physical layer device of claim 1 further comprising:
a scrambler that communicates with the encoder and that scrambles the encoded data block to produce a scrambled data block; and
a sync adder that adds a sync header to the scrambled data block, wherein the sync header has a first state when the scrambled data block only includes the data portions, and wherein the sync header has a second state when the scrambled data block includes at least one of the control code portions.

9. The physical layer device of claim 8 further comprising a serializer/deserializer (SERDES) that communicates with the scrambler.

10. The physical layer device of claim 8 wherein the PCS module implements 64/66 bit encoding.

11. The physical layer device of claim 1 wherein the PCS device is otherwise compliant with the 10GBASE-R section of the Institute of Electrical and Electronics Engineers (IEEE) 802.3 specification.

12. A network transmitter that includes the physical layer device of claim 1.

13. A physical layer device for a network interface, the physical layer device comprising:
a serializer/deserializer that has an input and an output that outputs an encoded data block; and
a physical coding sublayer (PCS) device that communicates with the output and that includes a decoder that decodes the encoded data block, wherein the encoded data block includes an offset portion and n data blocks, each of the n data blocks including at least one of data portions and control code portions,
wherein the control code portions can be located within any of the n data blocks, and
wherein n is an integer greater than zero.

14. The physical layer device of claim 13 wherein the decoder reads the offset portion of the encoded data block.

15. The physical layer device of claim 13 wherein the decoder determines a quantity of the control code portions based on the offset portion.

16. The physical layer device of claim 15 further comprising a reconciliation device that includes a first interface that receives decoded data from the decoder.

17. The physical layer device of claim 16 wherein the first interface is at least one of XGMII compliant and GMII compliant.

18. The physical layer device of claim 15 wherein the encoded data block from the serializer/deserializer is scrambled and includes a sync header, and wherein the physical layer device further comprises a descrambler that descrambles the encoded data block for the decoder.

19. The physical layer device of claim 18 wherein the sync header has a first state when the n data blocks only include the data portions, and wherein the sync header has a second state when the n data blocks include at least one of the control code portions and wherein the decoder decodes the encoded data block based on the sync header and the offset portion.

20. The physical layer device of claim 13 wherein the PCS device implements 64/66 bit decoding.

21. A network receiver that includes the physical layer device of claim 13.

22. A method of operating a physical layer device for a network interface, the method comprising:
receiving data from a first interface of a reconciliation device; and
encoding the data to produce an encoded data block including an offset portion and n data blocks, each of the n data blocks including at least one of data portions and control code portions,
wherein the control code portions can be located within any of the n data blocks based on the offset portion, and
wherein n is an integer greater than zero.

23. The method of claim 22 wherein the offset portion includes at least one offset count.

24. The method of claim 22 wherein the offset portion includes a bit map that represents the data portions and control code portions included in the n data blocks.

25. The method of claim 22 wherein the offset portion indicates a quantity of the control code portions.

26. The method of claim 22 wherein the offset portion includes a data format that is based on a quantity of the control code portions.

27. The method of claim 22 further comprising aggregating data, which includes at least one of data portions and control portions, from m data streams received from the reconciliation device into a multiplexed data block.

28. The method of claim 22 wherein the first interface is at least one of XGMII compliant and GMII compliant.

29. The method of claim 22 further comprising:
scrambling the encoded data block to produce a scrambled data block; and
adding a sync header to the scrambled data block, wherein the sync header has a first state when the scrambled data block only includes the data portions, and wherein the sync header has a second state when the scrambled data block includes at least one of the control code portions.

30. The method of claim 29 further comprising serializing the scrambled data block.

31. The method of claim 22 wherein the encoding step is otherwise compliant with the 10GBASE-R section of the Institute of Electrical and Electronics Engineers (IEEE) 802.3 specification.

32. A method of operating a physical layer device of an Ethernet network device, the method comprising:
converting serialized data received by the physical layer device into an encoded data block; and
decoding the encoded data block in the physical layer device, wherein the encoded data block includes an offset portion and n data blocks, each of the n data blocks including at least one of data portions and control code portions,
wherein the control code portions can be located within any of the n data blocks, and
wherein n is an integer greater than zero.

33. The method of claim 32 wherein the decoding step includes reading the offset portion of the encoded data block.

34. The method of claim 32 further comprising determining a quantity of the control code portions based on the offset portion.

35. The method of claim 34 further comprising communicating decoded data from the decoding step to a first interface of a reconciliation device.

36. The method of claim 34 wherein the encoded data block is scrambled and includes a sync header, and wherein the method further comprises descrambling the encoded data block prior to the decoding step.

37. The method of claim 36 wherein the sync header has a first state when the n data blocks only include the data portions, wherein the sync header has a second state when the n data blocks include at least one of the control code portions and wherein the decoding step decodes the encoded data block based on the sync header and the offset portion.

38. A physical layer device for a network interface, the physical layer device comprising:
   reconciliation means for generating data at a first interface; and
   physical coding sublayer (PCS) means for communicating with the first interface and including encoding means for encoding the data to produce an encoded data block including an offset portion and n data blocks, each of the n data blocks including at least one of data portions and control code portions,
   wherein the encoding means is capable of locating the control code portions within any of the n data blocks based on the offset portion, and
   wherein n is an integer greater than zero.

39. The physical layer device of claim 38 wherein the offset portion includes at least one offset count.

40. The physical layer device of claim 38 wherein the offset portion includes a bit map that represents the data portions and control code portions included in the n data blocks.

41. The physical layer device of claim 38 wherein the offset portion indicates a quantity of the control code portions.

42. The physical layer device of claim 38 wherein the offset portion includes a data format that is based on a quantity of the control code portions.

43. The physical layer device of claim 38 further comprising multiplexing means for aggregating data, which includes at least one of data portions and control portions, from m data streams received from the reconciliation means into a multiplexed data block.

44. The physical layer device of claim 38 wherein the first interface is at least one of XGMII compliant and GMII compliant.

45. The physical layer device of claim 38 further comprising:
   scrambler means for communicating with the encoding means and scrambling the encoded data block to produce a scrambled data block; and
   sync adder means for adding a sync header to the scrambled data block, wherein the sync header has a first state when the scrambled data block only includes the data portions, and wherein the sync header has a second state when the scrambled data block includes at least one of the control code portions.

46. The physical layer device of claim 45 further comprising a serializer/deserializer (SERDES) means for communicating with the scrambler means.

47. The physical layer device of claim 45 wherein the PCS means implements 64/66 bit encoding.

48. The physical layer device of claim 38 wherein the PCS means is otherwise compliant with the 10GBASE-R section of the Institute of Electrical and Electronics Engineers (IEEE) 802.3 specification.

49. A physical layer device of an Ethernet network device, the physical layer device comprising:
   serializer/deserializer means for outputting an encoded data block from an output thereof; and
   physical coding sublayer (PCS) means for communicating with the output including decoding means for decoding the encoded data block, wherein the encoded data block includes an offset portion and n data blocks, each of the n data blocks including at least one of data portions and control code portions,
   wherein the control code portions can be located within any of the n data blocks, and
   wherein n is an integer greater than zero.

50. The physical layer device of claim 49 wherein the decoding means reads the offset portion of the encoded data block.

51. The physical layer device of claim 49 wherein the decoding means determines a quantity of the control code portions based on the offset portion.

52. The physical layer device of claim 51 further comprising reconciliation means for receiving decoded data from the decoding means at a first interface thereof.

53. The physical layer device of claim 52 wherein the first interface is at least one of XGMII compliant and GMII compliant.

54. The physical layer device of claim 51 wherein the encoded data block from the serializer/deserializer is scrambled and includes a sync header, and wherein the physical layer device further comprises descrambler means for descrambling the encoded data block for the decoding means.

55. The physical layer device of claim 54 wherein the sync header has a first state when the n data blocks only include the data portions, and wherein the sync header has a second state when the n data blocks include at least one of the control code portions and wherein the decoding means decodes the encoded data block based on the sync header and the offset portion.

56. The physical layer device of claim 49 wherein the PCS means implements 64/66 bit decoding.

* * * * *